March 4, 1941. J. INDERGAND 2,233,781
ELECTRICITY METER
Filed Nov. 8, 1938
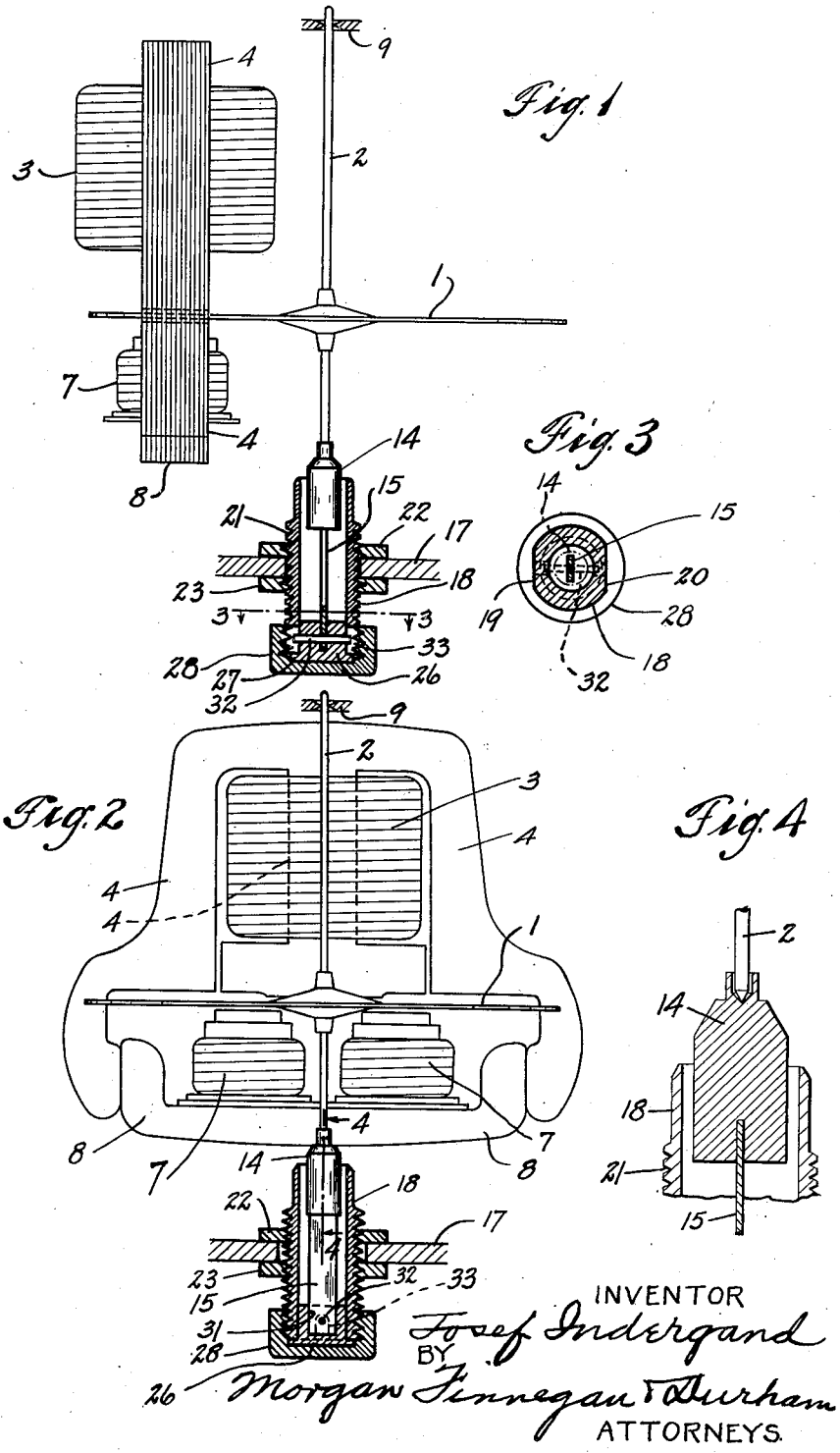
INVENTOR
Josef Indergand
BY
Morgan Finnegan & Durham
ATTORNEYS.

Patented Mar. 4, 1941

2,233,781

UNITED STATES PATENT OFFICE 2,233,781

ELECTRICITY METER

Josef Indergand, Zug, Switzerland, assignor to Landis & Gyr, A.-G., Zug, Switzerland, a corporation of Switzerland Application November 8, 1938, Serial No. 239,473
In Switzerland December 21, 1937

8 Claims. (Cl. 308—145)

The invention relates to new and useful improvements in electricity meters, and more particularly to new and useful improvements in bottom bearings for meter disc spindles to eliminate unnecessary and objectionable motion and noise.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serve to explain the principles of the invention. The various figures of the drawing are not to a uniform scale, the bottom bearing structure being enlarged with respect to the general meter structure so as to more clearly show the bearing structure.

Of the drawing:

Fig. 1 is an elevation of the principal parts of a meter with the bottom bearing structure in section;

Fig. 2 is a similar view looking at Fig. 1 from the right;

Fig. 3 is a horizontal fragmentary section on line 3—3 of Fig. 1; and

Fig. 4 is a vertical fragmentary section on line 4—4 of Fig. 2.

Objects of the invention are to eliminate or damp the humming noises in electricity meters, and to this end to provide controlled and predetermined directed resilient movement of the meter spindle bottom bearing; to provide a bottom support for the meter disc spindle permitting resilient movement in a predetermined direction while preventing movement of said support in other directions; to provide a bottom support which precludes movement in the direction of the general plane of the driving core but permits resilient movement in the perpendicular direction; to provide a simple, sturdy and reliable structure realizing said objects, together with others hereinafter pointed out or flowing from the novel features of the invention.

Referring now to the embodiment of the invention illustrated by way of example in the accompanying drawing, an electricity meter is shown, having a disc 1 fixed on a vertically-disposed, rotatably-mounted spindle 2. The electro-magnetic drive for the disc comprises a pressure coil 3 wound upon a multi-armed core 4, and current coils 7 mounted on a multi-armed core 8. The electro-magnetic drive here shown is a known commercial form, and the form of drive may be varied as desired. The top end of the spindle 2 is rotatably journaled in a support 9. A braking magnet (not shown) is usually employed and exerts a braking flux on the currents induced in the meter disc.

In accordance with the present invention, there is provided a bottom end bearing for the spindle 2 which has directionally controlled resilient movement as the disc and spindle rotate, with the view to avoid objections and disadvantages of a fixed bearing, while at the same time avoiding objections and disadvantages inherent in non-directed or universal resilient movement of the bottom bearing. Accordingly, as embodied, the bottom end of the spindle 2 is rotatably supported on and within a recessed support 14. The recessed support 14 is supported upon a flat, vertically-disposed leaf spring 15, the top end of which is fixed to the bottom of the bearing support 14, and this leaf spring is positioned with its normal plane in a plane substantially parallel to that of the driving cores 4 and 8, as shown in Figs. 1 and 2. Thus the spring is prevented from movement perpendicularly to the plane or direction of extension of the driving cores 4 and 8, that is, perpendicularly to the plane of the paper in Fig. 1, but the spring is free for resilient movement in the perpendicular direction, that is, to the right or left in Fig. 1, while the meter is running.

In the embodied form of means for supporting this resilient mounting, the bottom 17 of the meter casing is apertured to receive a hollow sleeve 18, which sleeve is partially cylindrical but has two opposite flat sides 19 and 20, the aperture in the plate 17 being correspondingly shaped, whereby the sleeve may be inserted longitudinally into the opening in plate 17 but may not be rotated therein. The sleeve 18 has interrupted screw threads 21 on the exterior thereof, and flat nuts 22 and 23 screw threaded thereon to hold the sleeve in longitudinal position with respect to the casing 17. The upper part of sleeve 18 surrounds the support 14, and is of sufficient diameter to permit adequate lateral movement of the support 14 with its resilient mounting 15. A cylindrical head 26 supports spring 15, which head fits into the lower end of the cylindrical interior of the sleeve 18. Head 26 has an annular flange 27, which abuts against the bottom face of the cylinder 18. An interiorly-threaded cap nut 28 is screw-threaded onto the bottom end of the cylinder 18, and clamps flange 27 firmly against the lower end of the sleeve, and thereby holds the head 26 firmly in position against the bottom face of the sleeve. The bottom end of leaf spring 15 fits within and is supported in a correspondingly shaped recess 31 in the head 26. A pin 32 is fixed in the lower end of spring 15 within the recess, and fits into openings in the head 26 and extends outwardly at either side from the head, and into longitudinally-extending, diametrally-disposed recesses 33 formed in the bottom end of the sleeve 18. The positioning of the end of the spring 15 in the fitted slot 31 in the head and the ends of the pin 32 projecting into the slots 33 formed in sleeve 18 fixes and predetermines the angular position of the spring 15 with respect to sleeve 18, and the flat sided aperture in frame member 17 fixes the angular position of both sleeve and spring with respect to the cores 4 and 8. By means of this structure the spring 15 is held from rotational movement, is free to vibrate in the previously described predetermined direction, and the parts are quickly and readily assembled.

By means of the described arrangement the bearing support 14 of the footstep bearing can oscillate in a direction perpendicular to the general plane or flat sides of the driving core and thereby vibrations of this bearing support, such as result from the currents induced in the driving disc 1 by the driving cores and act on the bearing, are taken up and neutralized, so that they cannot be transmitted to the wall of the fixed part of the footstep bearing, i. e. the sleeve 18. Also vibrations, such as are liable to be produced by the braking flux of the permanent magnets employed in such meters, and suitably arranged in operative connection with the currents induced in the driving disc, are taken up and neutralized by this arrangement of the bearing support part 14. By the means above mentioned the unpleasant humming noise, which is liable to occur when the bearing support is arranged in a fixed guide in the footstep bearing, is obviated or at least so damped as to be inappreciable. The leaf spring, however, prevents any elastic yielding of the bearing support 14 in a direction parallel to the driving cores 4 and 8, i. e. in the direction of the turning moment, so that any vibration in this direction, which is liable to result in a noise in the driving of the counting train, is likewise avoided so far as possible. To the latter result the arrangement of the bearing support with a suitable amount of freedom in the fixed part of the footstep bearing also contributes, since by this means oscillation components of the bearing support in the direction of the turning moment cannot be transmitted to the wall of the sleeve, i.e. to the fixed part 18 of the footstep bearing.

The invention in its broader aspects is not limited to the specific mechanisms shown and described but departures may be made therefrom within the scope of the accompanying claims without departing from the principles of the invention and without sacrificing its chief advantages.

What I claim is:

1. In an electricity meter having an electromagnetic driving coil and core and a rotatable disc and spindle, a bottom end bearing for said spindle, including a cup on which the spindle end is rotatably supported, a fixed support for said cup, a resilient mounting for the cup on the fixed support comprising a flat leaf spring, the bottom end of the spring being mounted on said support and the cup being supported on the upper end of the spring, and means for maintaining the plane of the spring in the general plane of the driving core.

2. In an electricity meter having an electromagnetic driving coil and core and a rotatable disc and spindle, a bottom end bearing for said spindle, including a cup on which the spindle end is rotatably supported, a fixed support for said cup, a resilient mounting for the cup on the fixed support comprising a flat leaf spring, the bottom end of the spring being mounted on said support and the cup being supported on the upper end of the spring, and means whereby the fixed support may be mounted on the meter structure only with the leaf spring in a predetermined position with respect to the driving core.

3. In an electricity meter having an electromagnetic driving coil and core and a rotatable disc and spindle, a bottom end bearing for said spindle, including a cup on which the spindle end is rotatably supported, a flat resilient spring fixed to the bottom of the cup and extending downwardly therefrom, a sleeve surrounding the spring and cup and being of sufficient diameter to permit lateral movement thereof, and means fixed to the lower end of the sleeve for supporting the lower end of the flat spring.

4. In an electricity meter having an electromagnetic driving coil and core and a rotatable disc and spindle, a bottom end bearing for said spindle, including a cup on which the spindle end is rotatably supported, a flat resilient spring fixed to the bottom of the cup and extending downwardly therefrom, a sleeve surrounding the spring and cup and being of sufficient diameter to permit lateral movement thereof, and means fixed to the lower end of the sleeve for engaging the lower end of the flat spring and for supporting the spring in predetermined angular relation to the driving core.

5. In an electricity meter having an electromagnetic driving coil and core and a rotatable disc and spindle, a bottom end bearing for said spindle, including a cup on which the spindle end is rotatably supported, a flat resilient spring fixed to the bottom of the cup and extending downwardly therefrom, a sleeve surrounding the spring and cup and being of sufficient diameter to permit lateral movement thereof, means fixed to the lower end of the sleeve for engaging the lower end of the flat spring and for supporting the spring in predetermined angular relation to the sleeve, and means for supporting the sleeve on the meter structure only in predetermined angular relation to the driving core.

6. In an electricity meter having an electromagnetic driving coil and core and a rotatable disc and spindle, a bottom end bearing for said spindle, including a cup on which the spindle end is rotatably supported, a flat resilient spring fixed to the bottom of the cup and extending downwardly therefrom, a sleeve surrounding the spring and cup and being of sufficient diameter to permit lateral movement thereof, a head fitting within the lower end of said sleeve in predetermined angular position and formed to receive the lower end of the flat spring and to support the spring in predetermined angular position, and means for maintaining the sleeve and head in predetermined angular position with respect to the driving core.

7. In an electricity meter having an electromagnetic driving coil and core and a rotatable disc and spindle, a bottom end bearing for said spindle, including a cup on which the spindle end is rotatably supported, a flat resilient spring fixed to the bottom of the cup and extending downwardly therefrom, a sleeve surrounding the spring and cup and being of sufficient diameter to permit lateral movement thereof, there being diametrally-disposed slots in the lower end of said sleeve, a head fitting within the lower end of said sleeve and having in its upper face a recess receiving and fitting the lower end of said flat spring, and a pin extending through said head and spring and projecting at either side into the slots in the lower end of said sleeve.

8. In an electricity meter having an electromagnetic driving coil and core and a rotatable disc and spindle, a bottom end bearing for said spindle, including a cup on which the spindle end is rotatably supported, a flat resilient spring fixed to the bottom of the cup and extending downwardly therefrom, a sleeve surrounding the spring and cup and being of sufficient diameter to permit lateral movement thereof, said sleeve being exteriorly cylindrical with opposed, longitudinally extending flat portions and having mutilated screw threads on the intervening cylindrical portions, a supporting plate having a correspondingly shaped aperture to receive the sleeve longitudinally while preventing angular movement thereof, nuts screw-threaded on the sleeve and clamping it to the plate, and means fixed to the lower end of the sleeve for receiving the lower end of the flat spring and supporting the spring in predetermined angular relation to the sleeve.

JOSEF INDERGAND.